United States Patent
Weinmann et al.

(10) Patent No.: US 8,793,050 B2
(45) Date of Patent: Jul. 29, 2014

(54) CONNECTION OF PERSONAL TERMINALS TO THE COMMUNICATION SYSTEM OF A MOTOR VEHICLE

(75) Inventors: Ulrich Weinmann, Eching (DE); Jens-Peter Weiss, Germering (DE); Thomas Stauner, Unterschleissheim (DE); Wolfram Manthey, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 830 days.

(21) Appl. No.: 11/943,305

(22) Filed: Nov. 20, 2007

(65) Prior Publication Data

US 2008/0133084 A1 Jun. 5, 2008

Related U.S. Application Data

(63) Continuation of application No. PCT/EP2006/004247, filed on May 6, 2006.

(30) Foreign Application Priority Data

May 21, 2005 (DE) .......... 10 2005 023 544

(51) Int. Cl.
- *G06F 7/00* (2006.01)
- *B60K 35/00* (2006.01)
- *B60K 37/06* (2006.01)
- *H04M 1/60* (2006.01)
- *B60R 11/02* (2006.01)

(52) U.S. Cl.
CPC ..... *H04M 1/6083* (2013.01); *B60K 2350/1036* (2013.01); *B60K 2350/357* (2013.01); *B60K 35/00* (2013.01); *B60K 2350/352* (2013.01); *B60K 37/06* (2013.01); *B60R 11/0264* (2013.01); *B60K 2350/102* (2013.01); *B60K 2350/355* (2013.01); *B60R 11/0241* (2013.01)

USPC ......... 701/36; 455/569.2; 455/41.2; 455/345; 455/346; 455/456.1; 701/3; 701/28; 701/455; 701/91; 340/525; 340/691.6; 340/815.78; 340/901; 340/902

(58) Field of Classification Search
USPC ............................................ 701/36
See application file for complete search history.

(56) References Cited

U.S. PATENT DOCUMENTS

| 4,818,048 A | 4/1989 | Moss |
| 5,519,410 A | 5/1996 | Smalanskas et al. |

(Continued)

FOREIGN PATENT DOCUMENTS

| DE | 198 03 178 A1 | 7/1999 |
| DE | 198 53 665 A1 | 5/2000 |

(Continued)

OTHER PUBLICATIONS

International Search Report dated Jul. 26, 2006 with English translation (Four (4) pages).

(Continued)

*Primary Examiner* — Redhawn k Mawari
(74) *Attorney, Agent, or Firm* — Crowell & Moring LLP

(57) ABSTRACT

A communication system of a motor vehicle is provided. The communication system includes a vehicle operating unit, a vehicle output unit, and an interface computer. The interface computer is connected to the vehicle operating unit and the vehicle output unit. The interface computer is implemented for the purpose of connecting a mobile terminal to the vehicle operating unit and the vehicle output unit such that information from the mobile terminal is displayable on the vehicle output unit and the mobile terminal is operable via the vehicle operating unit.

19 Claims, 1 Drawing Sheet

(56) References Cited

U.S. PATENT DOCUMENTS

| | | | |
|---|---|---|---|
| 6,023,290 A | 2/2000 | Seita | |
| 6,426,706 B1* | 7/2002 | King | 340/903 |
| 6,574,734 B1 | 6/2003 | Colson et al. | |
| 6,707,387 B2* | 3/2004 | Noguchi et al. | 340/691.6 |
| 6,798,084 B1 | 9/2004 | Gobel et al. | |
| 6,941,194 B1 | 9/2005 | Dauner et al. | |
| 6,961,644 B2* | 11/2005 | Mercier et al. | 701/36 |
| 7,349,722 B2* | 3/2008 | Witkowski et al. | 455/569.2 |
| 7,366,892 B2* | 4/2008 | Spaur et al. | 713/151 |
| 2001/0016789 A1 | 8/2001 | Staiger | |
| 2003/0130776 A1 | 7/2003 | Busse | |
| 2003/0162572 A1* | 8/2003 | Winters | 455/569 |
| 2004/0203370 A1 | 10/2004 | Luo et al. | |
| 2005/0070245 A1* | 3/2005 | Nath et al. | 455/345 |
| 2006/0161312 A1 | 7/2006 | Juengling et al. | |
| 2008/0133084 A1* | 6/2008 | Weinmann et al. | 701/36 |

FOREIGN PATENT DOCUMENTS

| | | |
|---|---|---|
| DE | 199 25 570 A1 | 12/2000 |
| DE | 199 21 533 C1 | 1/2001 |
| DE | 199 29 331 A1 | 1/2001 |
| DE | 199 48 794 A1 | 5/2001 |
| DE | 100 38 242 A1 | 2/2002 |
| DE | 696 19 582 T2 | 10/2002 |
| DE | 103 10 115 A1 | 9/2004 |

OTHER PUBLICATIONS

German Search Report dated Mar. 13, 2007 with English translation (Nine (9) pages).

* cited by examiner

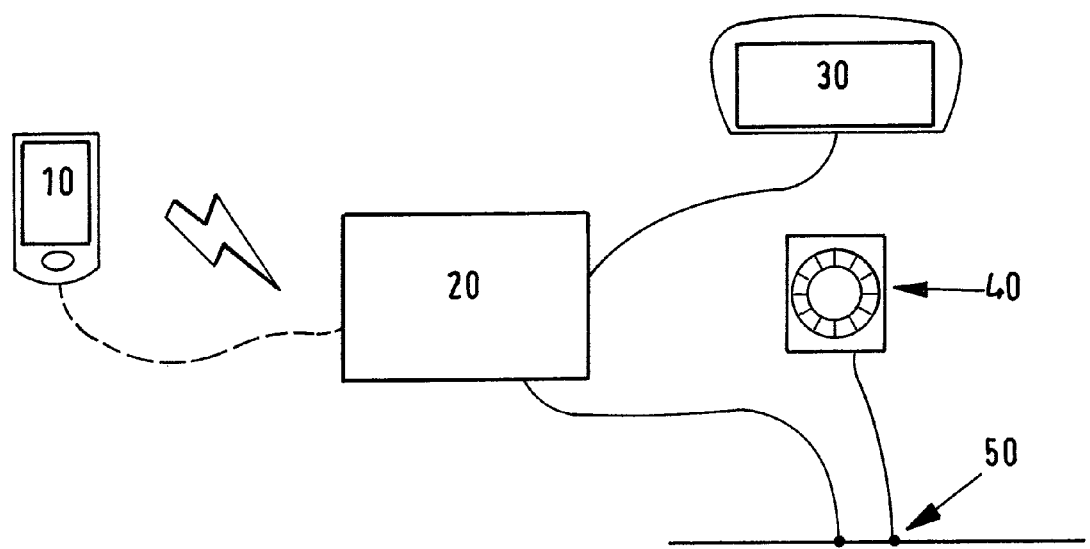

CONNECTION OF PERSONAL TERMINALS TO THE COMMUNICATION SYSTEM OF A MOTOR VEHICLE

CROSS REFERENCE TO RELATED APPLICATIONS

This application is a continuation of PCT International Application No. PCT/EP2006/004247, filed May 6, 2006, which claims priority under 35 U.S.C. §119 to German Patent Application No. 10 2005 023 544.1, filed May 21, 2005, the entire disclosures of which are herein expressly incorporated by reference.

BACKGROUND AND SUMMARY OF THE INVENTION

The present invention relates to a communication system of a vehicle. Such a communication system typically has a vehicle operating unit, a vehicle output unit, and an interface computer, which is connected to the vehicle operating unit and the vehicle output unit.

Typically, output media such as a so-called central information display, a heads-up display, or a display in the dashboard of the vehicle are used as the vehicle output unit. The heads-up display allows the projection of information on the windshield of the vehicle. The vehicle occupants may thus simultaneously track the traffic events and read the information off of the windshield. These vehicle output units typically communicate with vehicle sensors to display the travel velocity, the oil temperature, or other vehicle-specific data to the driver, for example. Further output units include audio output units in the form of signal tones, for example, or haptic feedback at a so-called ergocommander or steering wheel, for example.

There are manifold embodiments of vehicle operating units. These are typically buttons or switches which are used for controlling vehicle functions. The light switch or the turn signals are vehicle operating units which are used in every motor vehicle. Operating units for air-conditioning and stereo systems are provided standard in modern vehicles. A touch screen, a keyboard, a mouse, and/or a microphone for speech control are also used as vehicle operating units. Further functions such as navigation systems and wireless telephones are currently also controlled by the vehicle driver via operating units.

Because of the large number of vehicle operating units and output units in modern vehicles, a permanent danger exists that the driver will be distracted from the driving events by the manifold switches and displays. For this reason, acoustic display and operating units are increasingly used in vehicles, because they allow vehicle functions to be controlled acoustically while the traffic is visually observed. Modern speech-recognition technology allows the input of a limited number of commands by the human voice. Because of the large number of interfering noises such as engine noise, wind noise, or voices of passengers, the speech-recognition rates are further limited. Frequently, ergocommanders are used, to allow simple operation of manifold vehicle functions. The ergocommander is a special device which may be rotated clockwise and counterclockwise. It may be displaced horizontally and vertically like a joystick, and it may be pressed like a button. Because of the use of the ergocommander, manifold different vehicle functions may be activated using a single vehicle operating unit.

A communication system for a vehicle is known from German Patent Application DE 199 25 570 A1. The known communication system has vehicle-side application units for performing assigned application functions and multiple communication channels for communicating with the vehicle outside world. A central communication platform unit is provided for variable connection of the application units to the communication channels.

In addition to the actual internal vehicle functions, mobile terminals are increasingly used by the driver during travel. The mobile terminals particularly include mobile computers, telecommunication terminals, and/or data memories. Mobile telecommunication terminals are also referred to as mobile telephones or cell phones in this country. So-called laptops or personal digital assistants (PDAs) are used as mobile computers. Modern MP3 players also represent mobile computers, which have limited functionality in comparison to the laptops or PDAs, however. Vehicle drivers currently also want to access their mobile terminals during travel. Vehicle holders are offered for the mobile terminals, in which the mobile terminals may be mounted removably. During operation of the mobile terminals, however, the driver is distracted from the traffic events.

It is therefore an object of the present invention to allow the vehicle driver to operate mobile terminals ergonomically, without being strongly distracted from the traffic events.

This and other objects and advantages are achieved by a communication system of a motor vehicle in accordance with the present invention.

The subject matter of the present invention relates to a communication system of a motor vehicle. The communication system includes a vehicle operating unit, a vehicle output unit, and an interface computer. The interface computer is connected to the vehicle operating unit and the vehicle output unit. The interface computer is implemented for the purpose of connecting a mobile terminal to the vehicle operating unit and the vehicle output unit in such a way that information from the mobile terminal is displayable on the vehicle output unit and the mobile terminal is operable via the vehicle operating unit. The vehicle driver may thus control the mobile terminal using the internal vehicle output and operating units and does not have to observe the keyboard and the display of the mobile terminal himself. Therefore, the number of switches to be operated and displays to be observed is reduced, so that the driver does not have to look for the displays and switches during travel. The vehicle operating units are, in contrast to the mobile terminals, oriented to the requirements of a vehicle driver. The driver may operate the mobile terminal using the same switches as the air-conditioning system or the integrated navigation system, for example.

In particular, an ergocommander, a touch screen, a keyboard, a mouse, and/or a microphone for speech control may be used as the vehicle operating unit in the vehicle. Speech control has the advantage that the driver does not have to remove his hand from the steering wheel to operate the mobile terminal. The touch screen is a display panel which is used both for displaying information and also for inputting commands. The commands are input by touching the touch screen using the fingers or a suitable stylus. The information which is typically displayed on the display of the laptop or PDA is now visible on the touch screen. A display screen, lamps, and/or a heads-up display may be used as the vehicle output unit. Furthermore, audio output units are used, in particular for speech output.

The interface computer is preferably implemented for the purpose of connecting a mobile computer, telecommunication terminal, and/or a data memory to the vehicle operating unit and the vehicle output unit. The mobile computer may be a laptop, a PDA, an MP3 player or the like. Mobile telephones may be used as the telecommunication terminal. However, there are also mobile computers which may also be used as mobile telephones. For example, UMTS (universal mobile telecommunication system) or GSM (global system for mobile communications) communication cards may be used in laptops or PDAs to connect these mobile computers wirelessly to the Internet via UMTS. In addition, further connection technologies, such as WLAN (wireless local area network) are conceivable. The Internet pages may then be displayed on the vehicle output unit such as the heads-up display.

The interface computer according to the present invention advantageously has a first interface for wired communication with the mobile terminal. A USB interface particularly comes into consideration as the interface. USB stands for universal serial bus, which is a standard interface for connecting peripheral devices to computers. Furthermore, the interface computer according to the present invention may additionally or alternatively have a second interface for wireless communication with the mobile terminal. Currently, WLAN and Bluetooth are known interfaces which are used for wireless communication between computers. WLAN stands for wireless LAN and refers to a wireless network. Bluetooth is a further standard for the wireless transmission of speech and data.

A vehicle system bus is advantageously provided as a component of the communication system. The vehicle system bus is connected to the interface computer. The interface computer functions as a gateway. A gateway allows the communication between computers from different networks, which are based on entirely different protocols. The interface computer allows communication between a WLAN and the internal vehicle CAN, MOST, or Flexray, for example. CAN stands for controller area network and represents a computer-supported data bus system for serial data transmission. Various control units may exchange their information via CAN. CAN is, like MOST, a bus system which is used in modern vehicles. MOST is an abbreviation of media-oriented systems transport. It is a bus in the vehicle which is used in the infotainment field, for example. It is thus not only possible to control the mobile terminal via the vehicle operating units, but rather the mobile terminal may also access vehicle information.

The communication between the mobile terminal and the vehicle operating unit and vehicle output unit may thus be controlled as a function of the vehicle status, the interface computer receiving information about the vehicle status from the vehicle system bus. For example, the operation of the mobile terminal per se or special functions may be suppressed if the vehicle velocity exceeds a predetermined value, such as 10 km/h. If the vehicle independently recognizes hazardous situations in traffic, in this case, the communication with the mobile terminal may be suppressed.

The interface computer may have access protection, so that the mobile terminal may only access authorized vehicle functions. A firewall comes into consideration as a possible access protection, for example. The firewall shields the vehicle bus from unauthorized accesses by the mobile terminal. The access protection may also be implemented as hardware. Furthermore, the firewall may be embodied in the form of a software component on a so-called head unit, which operates the interface to the terminal and is isolated from the further vehicle systems and/or only permits specific accesses.

The interface computer may represent the head unit itself. The head unit is the central computing unit for infotainment functions in the vehicle. In this case, a further separate computer is not necessary. To secure the vehicle electronics, an authentication may also be provided, so that no unauthorized user may access the vehicle data. In addition, the exchanged data may be encrypted, so that it may not be tapped by unauthorized third parties. This is applied in particular if the information exchange between the mobile terminal and the interface computer occurs wirelessly. With wireless communication, the possibility exists for third parties to read the exchanged information, if it is not suitably encrypted.

An exemplary embodiment of the present invention is described below with reference to the attached FIGURE.

Other objects, advantages and novel features of the present invention will become apparent from the following detailed description of the invention when considered in conjunction with the accompanying drawing.

BRIEF DESCRIPTION OF THE DRAWING

The FIGURE schematically shows a communication system according to an exemplary embodiment of the present invention.

DETAILED DESCRIPTION OF THE DRAWING

The communication system according to the FIGURE includes a mobile terminal 10, which is a PDA in the exemplary embodiment. The PDA 10 is wirelessly connected to an interface computer 20. The connection in the exemplary embodiment is a WLAN connection. Both the PDA 10 and also the interface computer 20 have a WLAN interface for providing the wireless connection. The interface computer 20 is additionally connected to a vehicle output unit 30 and a vehicle system bus 50. An operating unit 40 is indirectly connected via the vehicle system bus 50 to the interface computer 20.

The vehicle output unit 30 is a central display in the exemplary embodiment, which is situated in the dashboard of the vehicle, for example. The schematically illustrated vehicle operating unit 40 is an ergocommander, which may also be used for activating further vehicle functions in connection with the vehicle display unit 30. The vehicle system bus 50 is a CAN or MOST bus, which is connected to multiple vehicle devices. Preferably, a MOST bus having a gateway to a CAN bus is provided. The vehicle thus has multiple buses connected via gateways. The interface computer 20 is a gateway which allows communication between the WLAN network and the CAN network.

The information provided for display on the PDA 10 may be transmitted via the WLAN to the interface computer 20. The information to be displayed reaches the display 30 via a fixed line, for example. The information displayed on the display 30 thus corresponds to the display panel on the PDA 10.

Alternatively, the information of the PDA may be displayed on the display field in a representation adapted to the vehicle operating concept, for example, using the same colors and types of script as otherwise used in the vehicle. The calculation of the tailored representation is typically assumed by the PDA. The interface computer may do this instead. The driver may observe the content of the PDA 10 on the display 30, even if the PDA 10 is housed in the trunk of the vehicle. The operation of the PDA 10 may be performed via the ergocommander 40. A cursor may be navigated over the represented information using the ergocommander 40. For example, it is possible to retrieve an office document stored in the PDA 10, or retrieve stored e-mails or Internet pages. Music or video files may be played back via the vehicle audio/video system (not shown). For this purpose, the interface computer 20 conducts the music files to the audio/video system via the vehicle system bus 50.

Finally, it is also possible to output vehicle-specific information via the vehicle system bus 50 and the interface computer 20 to the PDA 10. For example, operational malfunctions recognized by the vehicle electronics may be output to the PDA 10. The access of the PDA 10 to the vehicle electronics via the vehicle system bus 50 is restricted using a firewall, which is installed on the interface computer 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system of a motor vehicle, comprising:
   a vehicle operating unit;
   a vehicle output unit; and
   an interface computer, which is connected to the vehicle operating unit and the vehicle output unit,
   wherein the interface computer is implemented to connect a mobile terminal to the vehicle operating unit and the vehicle output unit such that information from the mobile terminal is displayable on the vehicle output unit and the mobile terminal is operable via the vehicle operating unit,
   wherein the interface computer controls communication between the mobile terminal, the vehicle operating unit and the vehicle output unit, based upon vehicle status information received from a vehicle system disposed in the vehicle, and
   wherein the vehicle operating unit comprises a touch screen and an ergocommander having a structure that provides clockwise and counterclockwise rotation, horizontal and vertical displacement as a joystick, and vertical depression as a button.

2. The communication system according to claim 1, wherein the vehicle operating unit includes a keyboard and a mouse.

3. The communication system according to claim 1, wherein the vehicle output unit includes a haptic output unit.

4. The communication system according to claim 1, wherein the interface computer is implemented to connect at least one of a mobile computer, a telecommunication terminal, and a data memory to the vehicle operating unit and the vehicle output unit.

5. The communication system according to claim 1, wherein the interface computer includes at least one of a first interface for wired communication with the mobile terminal and a second interface for wireless communication with the mobile terminal.

6. The communication system according to claim 1, wherein a vehicle system bus is provided, which is connected to the interface computer.

7. The communication system according to claim 6, wherein the interface computer receives information about the vehicle status from the vehicle system bus.

8. The communication system according to claim 1, wherein the interface computer has an access protection, so that the mobile terminal may only access authorized vehicle functions.

9. The communication system according to claim 1, wherein the interface computer comprises a central computing unit of the vehicle.

10. The communication system according to claim 2, wherein the vehicle output unit includes a haptic output unit.

11. The communication system according to claim 2, wherein the interface computer is implemented to connect at least one of a mobile computer, a telecommunication terminal, and a data memory to the vehicle operating unit and the vehicle output unit.

12. The communication system according to claim 3, wherein the interface computer is implemented to connect at least one of a mobile computer, a telecommunication terminal, and a data memory to the vehicle operating unit and the vehicle output unit.

13. The communication system according to claim 2, wherein the interface computer includes at least one of a first interface for wired communication with the mobile terminal and a second interface for wireless communication with the mobile terminal.

14. The communication system according to claim 3, wherein the interface computer includes at least one of a first interface for wired communication with the mobile terminal and a second interface for wireless communication with the mobile terminal.

15. The communication system according to claim 2, wherein a vehicle system bus is provided, which is connected to the interface computer.

16. The communication system according to claim 2, wherein the interface computer has an access protection, so that the mobile terminal may only access authorized vehicle functions.

17. The communication system according to claim 2, wherein the interface computer comprises a central computing unit of the vehicle.

18. The communication system according to claim 1, wherein operation of the mobile terminal is suspended when the vehicle status information indicates that a predetermined value is exceeded.

19. The communication system according to claim 18, wherein the predetermined value is a vehicle speed.

* * * * *